United States Patent Office 2,806,060
Patented Sept. 10, 1957

2,806,060
POLYVALENT METAL ION CHELATING AGENT

Frederick C. Bersworth, Framingham Center, and Albert E. Frost, Millis, Mass., assignors, by direct and mesne assignments, to The Dow Chemical Company, Midland, Mich., a corporation of Delaware No Drawing. Application September 3, 1954,
Serial No. 454,208

3 Claims. (Cl. 260—534)

This invention relates to new compounds particularly useful as chelating agents for trivalent and bivalent metal ions, further characterized by their effectiveness in solutions over a wide range of pH.

It is a basic object of this invention to provide compounds useful for the chelation of polyvalent metal ions in a range of pH from strong alkaline to strong acid solution.

It is another object of the invention to provide compounds having acid and alcohol functions within the molecule such that a polydentate chelating structure is available for the full coordination of polyvalent metal ions.

Other objects and advantages of the invention will in part be obvious and in part appear hereinafter.

The invention accordingly is embodied in chelating agents having the following essential structure:

$$\begin{array}{c} HOCH_2CH_2 \\ \diagdown \\ N-CH_2CHCH_2-N-X-N \\ \diagup \quad | \quad | \quad \diagdown \\ HOCH_2CH_2 \quad OH \quad R \quad R \end{array}$$

in which X is any bivalent low molecular weight alkylene radical which puts 2–3 carbon atoms between the nitrogens such as ethylene, propylene, isopropylene, 1–2 cyclohexylene, and R is selected from the group consisting of —CH₂COOM and —CH₂CH₂COOM, wherein M is hydrogen, alkali metal, ammonium or substituted ammonium.

A specific compound coming within the scope of the invention is identified chemically as N-(2-hydroxy-3-iminodiethanolpropyl) - N, N', N' - ethylenediaminetriacetic acid (and salts), having the formula:

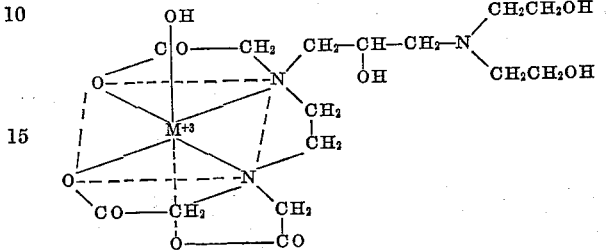

Analysis of the structure suggests steric and structural reasons for its versatility for it can be seen that within the compound there exists an N-(hydroxyethyl)-ethylenediamine-triacetic acid moiety bracketed and identified with Roman numeral I, and also a fused triethanolamine moity bracketed and identified with Roman numeral II.

Since this compound in one portion thereof has a group of acetic acid functions in chelating relationship with the amino nitrogens and in the second portion of the molecule contains a group of ethanol functions also in chelating relationship with the amino nitrogens, the compound chelates bivalent metal ions very effectively including the alkaline earth metal ions in strongly acid to strongly alkaline solutions to form chelates having the structure:

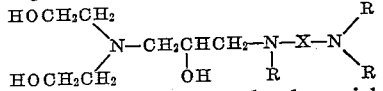

wherein R represents the polyalkanolamine residue.

Metals successfully chelated in pH ranges from 4 to 12 are alkaline earths, barium, strontium, magnesium, and transition metals, such as iron and chromium.

The chelation structure with trivalent metal ions is subject to some speculation, but it is probable that chelation occurs utilizing only the carboxylic acid and nitrogen groups, the remaining coordination positions of the hexacoordinate metals being satisfied by water as indicated in the formula sketched below:

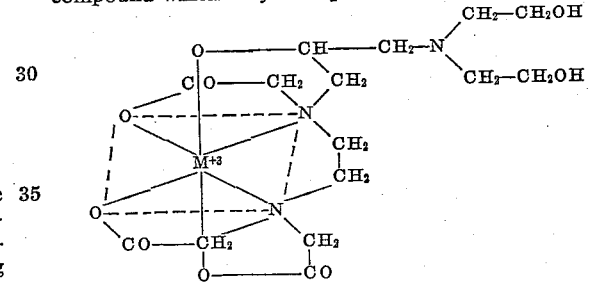

Metals such as iron, chromium, cobalt, aluminum, are typical trivalent ones chelated in substantially this fashion in solution.

In moderately alkaline solutions, that is pH 8 to 9, the hydroxyl group of the 2-hydroxypropyl radical would probably be involved in the chelate formation to give a compound which may be represented as follows:

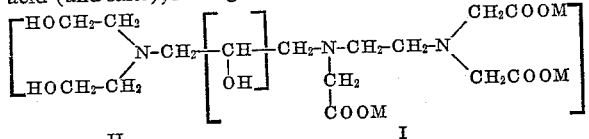

In caustic solutions bivalent metal ions are bound up by the acetic acid groups and nitrogen atoms. Trivalent metal ions like iron and chromium are bound through the triethanolamine groups so that the resulting compound may be represented as follows:

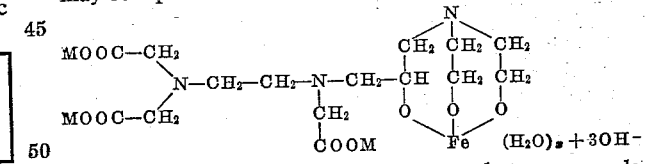

From these indications it is apparent that compounds of this class possess the unique property of being capable of simultaneously chelating a trivalent metal ion and a bivalent metal ion and that in this fashion two moles of metal ion may be chelated per mole of chelating agent. The effective chelating capacity of the compound for bivalent and trivalent metals extends over a broad range of metals including those named as well as a broad range of pH.

Preparation of compounds corresponding to the formula may be carried out by reacting diethanol amine with epichlorohydrin and condensing the resulting product with ethylenediamine and thereafter carboxymethylating. The sequence of reactions in synthesis is listed as follows:

(1)
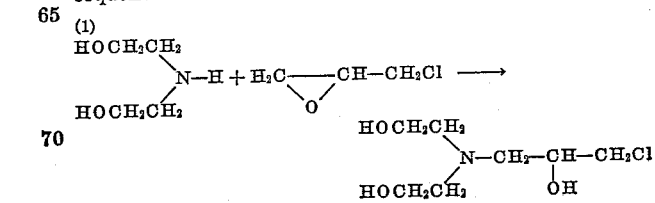

(2)
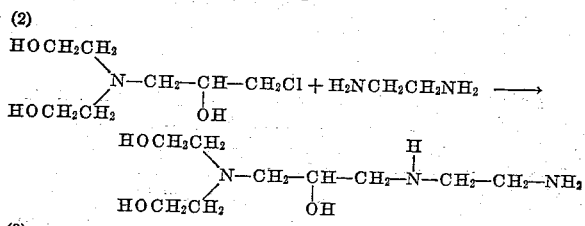

(3)
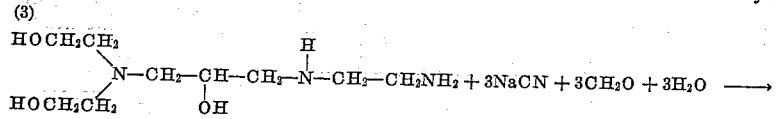

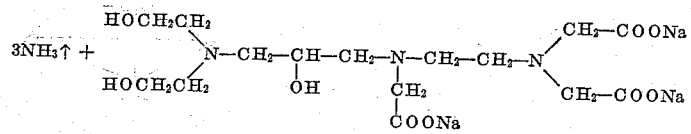 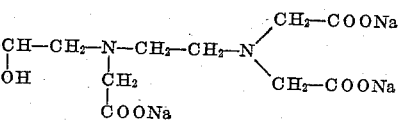

It is apparent that other methods of synthesis can be used and that this sequence of reactions is given by way of illustration and not of limitation.

The following examples of preparation are typical:

*Example 1*

One mole of N-(2-hydroxy-3-chloropropyl)-diethanolamine (211.6 g.) in 250 ml. of water was added dropwise with stirring to one mole of a 50 percent aqueous solution (120 g.) of ethylenediamine (molar ratio of 1:1) heated to slow reflux over a period of two hours. One mole of sodium hydroxide (41.2 g. of 97.4 percent sodium hydroxide in 250 ml. of water) was added as needed to keep the pH about 10. The mixture was refluxed for an additional 6 hours and then evaporated to dryness in vacuo. The semi-crystalline viscous yellow residue was taken up in alcohol to remove the sodium chloride and the alcohol solution evaporated to dryness in vacuo. The viscous yellow residue was then dissolved in water and carboxymethylated according to Bersworth Patent 2,407,645.

The resulting clear yellow solution is an excellent chelating agent for di- and trivalent metal ions including the alkaline earth metal ions and ferric ions in strongly acid to strongly caustic solutions.

*Example 2*

Same procedure as in Example 1 but using a molar ratio of N-(2-hydroxy-3-chloropropyl)-diethanolamine to ethylenediamine of 1:3.

The final reaction product, a clear yellow solution, possessed a higher chelation value per unit weight than did the reaction product of Example 1. This is due to a greater yield of the intermediate product N-(2-hydroxyethyl-3-iminodiethanolpropyl)-ethylenediamine resulting from the greater ratio of reactants used initially.

Evaporation of the aqueous solution to dryness gave a pale semi-solid mass believed to have the formula:

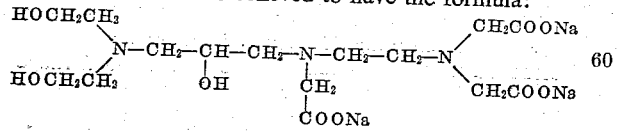

The free acid can be isolated by treating the alkaline reaction product with the acid form of an ion exchange resin, such as, Dowex-50, in a column or batch process. From the acid solution resulting, a viscous off-white residue is obtained upon evaporation. This product shows no tendency to crystallize but may well do so upon continued standing.

The triethanolamine portion of the molecule may combine with fatty acids (saturated and unsaturated), sulfonated fatty acids, detergent forming acids generally and mineral acids and other acids to form salts analogous to the triethanolamine salts. These products, especially those bearing fatty acids and detergent forming acids are of interest in soaps, detergents and emulsions.

An example of the preparation of such addition compounds is the following:

To 0.1 mole of the acid form of the chelating agent in 50 ml. of water was added 0.1 mole of stearic acid. The mixture was heated to about 80° C. to complete reaction. The resulting solution foamed readily even in the presence of metal ions and was stable toward polyvalent metal ions over the pH range of 2-14.

Similar results were obtained with oleic and 12-hydroxystearic acids. Also these same acids sulfonated gave directly parallel results.

It is apparent that in the synthesis, any alkali metal salt may be formed by use of the appropriate hydroxide in the formation of the alkaline medium. Thus, potassium, lithium, rubidium, cesium and ammonium salts are readily formed. Preparation of amine salts usually is carried out by forming the acid and then reacting with the appropriate amine.

What is claimed is:

1. Compounds corresponding to the following generic formula:

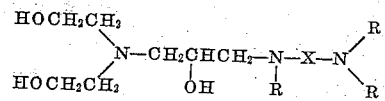

wherein X is any bivalent low molecular weight alkylene radical that places 2–3 carbon atoms between the nitrogens, and R is selected from the group consisting of —CH₂COOH and —CH₂CH₂COOH and their alkali metal, ammonium and amine salts.

2. The compound N-(2-hydroxy-3-iminodiethanolpropyl)-N,N',N'-ethylenediaminetriacetic acid.

3. The alkali metal salts of the compound defined in claim 2.

References Cited in the file of this patent
UNITED STATES PATENTS 2,387,735 Bersworth _____ Oct. 30, 1945
2,413,856 Bersworth _____ Jan. 7, 1947